(12) United States Patent
Huppe et al.

(10) Patent No.: US 10,907,490 B2
(45) Date of Patent: Feb. 2, 2021

(54) TURBINE ROTOR COOLANT SUPPLY SYSTEM

(71) Applicant: PRATT & WHITNEY CANADA CORP., Longueuil (CA)

(72) Inventors: Roger Huppe, Chambly (CA); Marc Tardif, Candiac (CA); Herve Turcotte, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 15 days.

(21) Appl. No.: 16/352,019

(22) Filed: Mar. 13, 2019

(65) Prior Publication Data

US 2019/0211694 A1 Jul. 11, 2019

Related U.S. Application Data

(63) Continuation of application No. 14/974,338, filed on Dec. 18, 2015, now Pat. No. 10,273,812.

(51) Int. Cl.
| | |
|---|---|
| *F01D 9/06* | (2006.01) |
| *F01D 5/08* | (2006.01) |
| *F01D 5/18* | (2006.01) |
| *F01D 25/12* | (2006.01) |

(52) U.S. Cl.
CPC .............. *F01D 9/065* (2013.01); *F01D 5/081* (2013.01); *F01D 5/187* (2013.01); *F01D 25/12* (2013.01); *F05D 2220/32* (2013.01); *F05D 2260/231* (2013.01)

(58) Field of Classification Search
CPC . F01D 5/187; F01D 25/12; F01D 9/06; F01D 9/065; F02C 3/04; F05D 2260/231; F05D 2220/32
See application file for complete search history.

(56) References Cited

U.S. PATENT DOCUMENTS

| | | |
|---|---|---|
| 2,961,150 A | 11/1960 | Pirtle |
| 3,261,587 A | 7/1966 | Rowley |
| 3,945,758 A | 3/1976 | Lee |
| 3,972,181 A | 8/1976 | Swayne |
| 4,292,008 A | 9/1981 | Grosjean et al. |
| 4,321,007 A | 3/1982 | Dennison et al. |
| 4,369,016 A | 1/1983 | Dennison |

(Continued)

FOREIGN PATENT DOCUMENTS

| | | |
|---|---|---|
| CN | 107849938 A | 3/2018 |
| EP | 1193371 | 4/2003 |

*Primary Examiner* — Eldon T Brockman
(74) *Attorney, Agent, or Firm* — Norton Rose Fulbright Canada LLP

(57) ABSTRACT

An air supply system is configured to provide cooling air with reduced heat pickup to a turbine rotor of a gas turbine engine. The system comprises a first cooling passage extending between a hollow airfoil and an internal pipe extending through the airfoil. The airfoil extends through a hot gas path. A second cooling passage extends through the internal pipe. The coolant flowing through the second cooling passage is thermally isolated from the airfoil hot surface by the flow of coolant flowing through the first cooling passage. The first and second cooling passages have a common output flow to a rotor cavity of the turbine rotor where coolant flows from the first and second cooling passages combine according to a predetermined ratio.

8 Claims, 3 Drawing Sheets

(56) References Cited

U.S. PATENT DOCUMENTS

| | | |
|---|---|---|
| 4,435,958 A | 3/1984 | Klees |
| 4,448,019 A | 5/1984 | Klees |
| 4,462,204 A | 7/1984 | Hull |
| 4,553,901 A | 11/1985 | Laurello |
| 4,793,770 A | 12/1988 | Schonewald et al. |
| 4,807,433 A | 2/1989 | Maclin et al. |
| 4,820,116 A | 4/1989 | Hovan et al. |
| 4,979,872 A | 12/1990 | Myers et al. |
| 4,989,406 A | 2/1991 | Vdoviak et al. |
| 5,020,318 A * | 6/1991 | Vdoviak .......... F01D 9/065 60/226.1 |
| 5,160,251 A | 11/1992 | Ciokajlo |
| 5,167,484 A | 12/1992 | Ponziani et al. |
| 5,180,282 A | 1/1993 | Lenhart et al. |
| 5,253,976 A | 10/1993 | Cunha |
| 5,272,869 A | 12/1993 | Dawson et al. |
| 5,273,397 A | 12/1993 | Czachor et al. |
| 5,292,227 A | 3/1994 | Czachor et al. |
| 5,340,274 A | 8/1994 | Cunha |
| 5,438,756 A | 8/1995 | Halchak et al. |
| 5,482,431 A | 1/1996 | Taylor |
| 5,581,996 A | 12/1996 | Koch et al. |
| 5,593,277 A | 1/1997 | Proctor et al. |
| 5,597,286 A | 1/1997 | Dawson et al. |
| 5,630,700 A | 5/1997 | Olsen et al. |
| 5,630,703 A | 5/1997 | Hendley et al. |
| 5,743,708 A | 4/1998 | Cunha et al. |
| 5,746,574 A | 5/1998 | Czachor et al. |
| 5,806,303 A | 9/1998 | Johnson |
| 5,809,772 A | 9/1998 | Giffin, III et al. |
| 5,832,715 A | 11/1998 | Dev |
| 5,867,980 A | 2/1999 | Bartos |
| 5,941,683 A | 8/1999 | Ridyard et al. |
| 5,996,331 A | 12/1999 | Palmer |
| 6,035,627 A | 3/2000 | Liu |
| 6,142,730 A | 11/2000 | Tomita et al. |
| 6,195,983 B1 | 3/2001 | Wadia et al. |
| 6,217,279 B1 | 4/2001 | Ai et al. |
| 6,227,801 B1 | 5/2001 | Liu |
| 6,351,938 B1 | 3/2002 | Kerrebrock |
| 6,357,999 B1 | 3/2002 | Pearce et al. |
| 6,358,001 B1 | 3/2002 | Bosel et al. |
| 6,398,485 B1 | 6/2002 | Frosini |
| 6,398,486 B1 | 6/2002 | Storey et al. |
| 6,431,820 B1 | 8/2002 | Beacock et al. |
| 6,439,841 B1 | 8/2002 | Bosel |
| 6,558,114 B1 | 5/2003 | Tapley et al. |
| 6,578,362 B1 | 6/2003 | Coffinberry |
| 6,585,482 B1 | 7/2003 | Liotta et al. |
| 6,619,030 B1 | 9/2003 | Seda et al. |
| 6,672,072 B1 | 1/2004 | Giffin, III |
| 6,708,482 B2 | 3/2004 | Seda |
| 6,749,395 B1 | 6/2004 | Reichert et al. |
| 6,763,652 B2 | 7/2004 | Baughman et al. |
| 6,860,716 B2 | 3/2005 | Czachor et al. |
| 6,902,371 B2 | 6/2005 | Anderson, Jr. et al. |
| 6,916,151 B2 | 7/2005 | Judet et al. |
| 6,981,841 B2 | 1/2006 | Krammer et al. |
| 7,007,488 B2 * | 3/2006 | Orlando ............ F01D 9/065 60/782 |
| 7,048,496 B2 | 5/2006 | Proctor et al. |
| 7,063,505 B2 | 6/2006 | Czachor |
| 7,124,572 B2 | 10/2006 | Aycock et al. |
| 7,210,899 B2 | 5/2007 | Wilson, Jr. |
| 7,266,941 B2 | 9/2007 | Eleftheriou et al. |
| 7,334,392 B2 | 2/2008 | Moniz et al. |
| 7,383,686 B2 | 6/2008 | Aycock et al. |
| 7,673,461 B2 | 3/2010 | Cameriano et al. |
| 7,743,613 B2 | 6/2010 | Lee et al. |
| 7,802,962 B2 | 9/2010 | Sjöqvist |
| 7,870,742 B2 | 1/2011 | Lee et al. |
| 7,926,289 B2 | 4/2011 | Lee et al. |
| 8,099,962 B2 | 1/2012 | Durocher et al. |
| 8,162,593 B2 | 4/2012 | Guimbard et al. |
| 8,182,205 B2 | 5/2012 | Caruso et al. |
| 8,511,969 B2 | 8/2013 | Durocher et al. |
| 8,876,463 B2 | 11/2014 | Durocher et al. |
| 9,347,374 B2 | 5/2016 | Suciu et al. |
| 9,447,694 B2 | 9/2016 | Sanchez et al. |
| 9,789,604 B2 | 10/2017 | Huang et al. |
| 9,856,741 B2 | 1/2018 | Grant |
| 9,856,750 B2 | 1/2018 | Farah |
| 9,915,171 B2 | 3/2018 | Winn et al. |
| 9,920,651 B2 | 3/2018 | Cherolis et al. |
| 9,951,471 B2 | 4/2018 | Faufau et al. |
| 10,180,068 B2 | 1/2019 | Helmers |
| 2006/0005546 A1 * | 1/2006 | Orlando ............ F02C 6/08 60/782 |
| 2006/0288686 A1 | 12/2006 | Cherry et al. |
| 2007/0025837 A1 | 2/2007 | Pezzetti, Jr. et al. |
| 2008/0112793 A1 | 3/2008 | Lee et al. |
| 2008/0112791 A1 | 5/2008 | Lee et al. |
| 2008/0112795 A1 | 5/2008 | Lee et al. |
| 2008/0112797 A1 | 5/2008 | Seitzer et al. |
| 2010/0132369 A1 | 6/2010 | Durocher et al. |
| 2010/0135770 A1 | 6/2010 | Durocher et al. |
| 2010/0275572 A1 | 11/2010 | Durocher |
| 2010/0303608 A1 | 12/2010 | Kataoka et al. |
| 2010/0303610 A1 | 12/2010 | Wang et al. |
| 2011/0030386 A1 | 2/2011 | Kumar et al. |
| 2011/0030387 A1 | 2/2011 | Kumar et al. |
| 2011/0079019 A1 | 4/2011 | Durocher et al. |
| 2011/0079020 A1 | 4/2011 | Durocher et al. |
| 2013/0028718 A1 | 1/2013 | Strom |
| 2014/0037429 A1 | 2/2014 | Okita |
| 2015/0226072 A1 | 8/2015 | Bluck |
| 2015/0338005 A1 | 11/2015 | Davis |
| 2016/0102577 A1 | 4/2016 | Grant |
| 2016/0123163 A1 | 5/2016 | Freeman |
| 2016/0208646 A1 | 7/2016 | Winn et al. |
| 2016/0230598 A1 | 8/2016 | Cherolis et al. |
| 2017/0002671 A1 | 1/2017 | Waite et al. |
| 2017/0022900 A1 | 1/2017 | Miller et al. |
| 2017/0114666 A1 | 4/2017 | Lefebvre et al. |
| 2017/0167273 A1 | 6/2017 | Maguire et al. |
| 2017/0175537 A1 | 6/2017 | Huppe et al. |
| 2018/0149085 A1 | 5/2018 | Chennoju et al. |
| 2018/0291812 A1 | 10/2018 | Payne et al. |
| 2019/0010871 A1 | 1/2019 | Yin et al. |

\* cited by examiner

TURBINE ROTOR COOLANT SUPPLY SYSTEM

CROSS-REFERENCE TO RELATED APPLICATIONS

This application is a continuation of U.S. patent application Ser. No. 14/974,338 filed Dec. 18, 2015, the entire contents of which are incorporated by reference herein.

TECHNICAL FIELD

The application relates generally to gas turbine engines and, more particularly, to a coolant supply system for providing coolant to a turbine rotor, such as a low pressure turbine (LPT) rotor.

BACKGROUND OF THE ART

It is known to provide a mid-turbine frame assembly between high and low pressure turbine (HPT and LPT) rotors to support bearings and to transfer loads radially outwardly to a core engine casing. The mid-turbine frame assembly typically comprises a mid-turbine frame supporting an annular inter-turbine duct therein. The inter-turbine duct is defined between outer and inner duct walls which are interconnected by a plurality of radial hollow struts, thereby forming an annular hot gas path to convey the working fluid from the HPT to the LPT. The inter-turbine duct and the hollow struts are subjected to high temperatures and therefore cooling air is typically introduced around the inter-turbine duct and into the hollow struts to cool the same. A portion of the cooling air supplied to the mid-turbine frame may also be used to cool the LPT rotor. However, as the air travels through the mid-turbine frame, the air picks up heat. As a result, the air available for cooling the LPT rotor is not as cool as it could be. This may have a detrimental effect on the integrity and durability of the LPT rotor.

There is thus room for improvement.

SUMMARY

In one aspect, there is provided an air supply system for providing cooling air to a turbine rotor of a gas turbine engine, the air supply system comprising: at least one hollow airfoil extending through a hot gas path, at least one internal pipe extending through the at least one hollow airfoil, a first cooling passage extending between the at least one hollow airfoil and the at least one internal pipe, a second cooling passage extending through the at least one internal pipe, the first and second cooling passages being fluidly linked to the turbine rotor where cooling air flows from the first and second cooling passages combine according to a predetermined ratio.

In a second aspect, there is provided a gas turbine engine comprising: first and second axially spaced-apart turbine rotors mounted for rotation about an engine axis, and a mid-turbine frame disposed axially between the first and second rotors, the mid-turbine frame comprising an inter-turbine duct having annular inner and outer walls and an array of circumferentially spaced-apart hollow airfoils extending radially between the inner and outer annular walls, the inner and outer walls defining a hot gas path therebetween for directing hot gases from the first turbine rotor to the second turbine rotor, at least one internal pipe extending through at least a first one of the hollow airfoils, a first cooling passage extending between the at least one internal pipe and the at least a first one of the hollow airfoils, a second cooling passage extending internally through the at least one internal pipe, the first and second cooling passages being fluidly linked to a rotor cavity of the second rotor.

In accordance with a still further general aspect, there is provided a method of reducing heat pick up as cooling air travels to a turbine rotor of a gas turbine engine, the method comprising: surrounding a core cooling flow with a separate annular cooling flow while the core cooling flow travels through a hollow airfoil extending through a hot gas path of the gas turbine engine, the annular cooling flow thermally shielding the core flow from thermally exposed surfaces of the hollow airfoil, and combining the core flow and the separate annular cooling flow in a predetermined ratio to provide a common output flow to the turbine rotor.

DESCRIPTION OF THE DRAWINGS

Reference is now made to the accompanying figures, in which.

DETAILED DESCRIPTION

Figure 1:
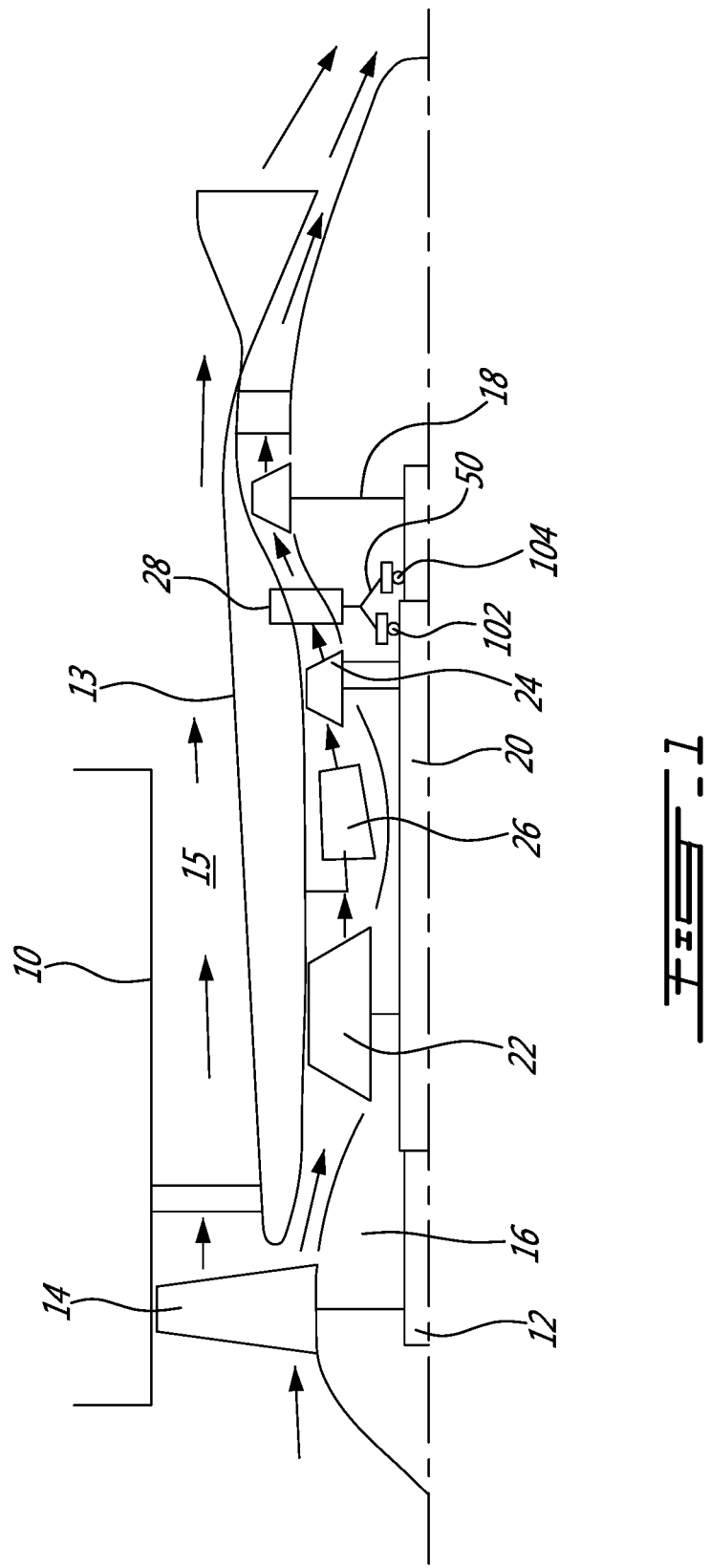
FIG. 1 is a schematic cross-section view of a turbofan gas turbine engine.

Referring to FIG. 1, an exemplary turbofan gas turbine engine includes a fan case 10, a core case 13, an air by-pass 15 between the fan case 10 and the core case 13, a low pressure (LP) spool which includes a fan 14, a LP compressor 16 and a LP turbine 18 connected by a LP shaft 12, and a high pressure (HP) spool, which includes a HP compressor 22 and a HP turbine 24 connected by a HP shaft 20. The core casing 13 surrounds the low and high pressure spools to define a main fluid path therethrough. In the main fluid path, there is provided a combustor 26 to generate combustion gases to power the HP turbine 24 and the LP turbine 18. A mid-turbine frame (MTF) 28 is disposed axially between the HP turbine 24 and the LP turbine 18 and supports a bearing housing 50 containing for example #4 and #5 bearings 102 and 104 around the respective shafts 20 and 12. The terms "axial" and "radial" used for various components below are defined with respect to the main engine axis shown but not numbered in FIG. 1.

Figure 2:
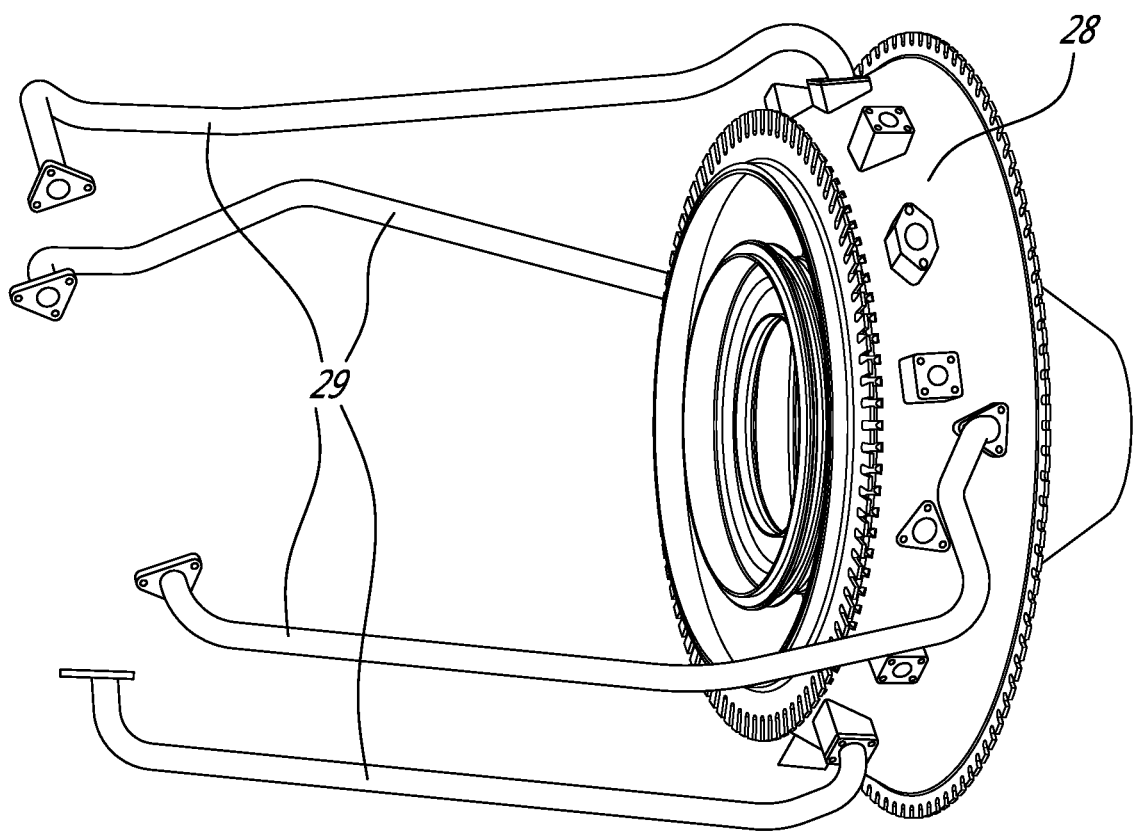
FIG. 2 is an isometric view of a mid-turbine frame and a set of external feed pipes for feeding cooling air to the mid-turbine frame of the engine shown in FIG. 1.

As shown in FIG. 2, a set of external feed pipes 29 may be provided to feed a coolant to the mid-turbine frame 28. In the illustrated embodiment, the set of feed pipes 29 comprises 4 pipes circumferentially distributed about the mid-turbine frame 28. However, it is understood that any suitable number of feed pipes may be provided. The coolant may be compressor bleed air. For instance, the feed pipes 29 may all be operatively connected to a source of P2.8 compressor bleed air.

Figure 3:
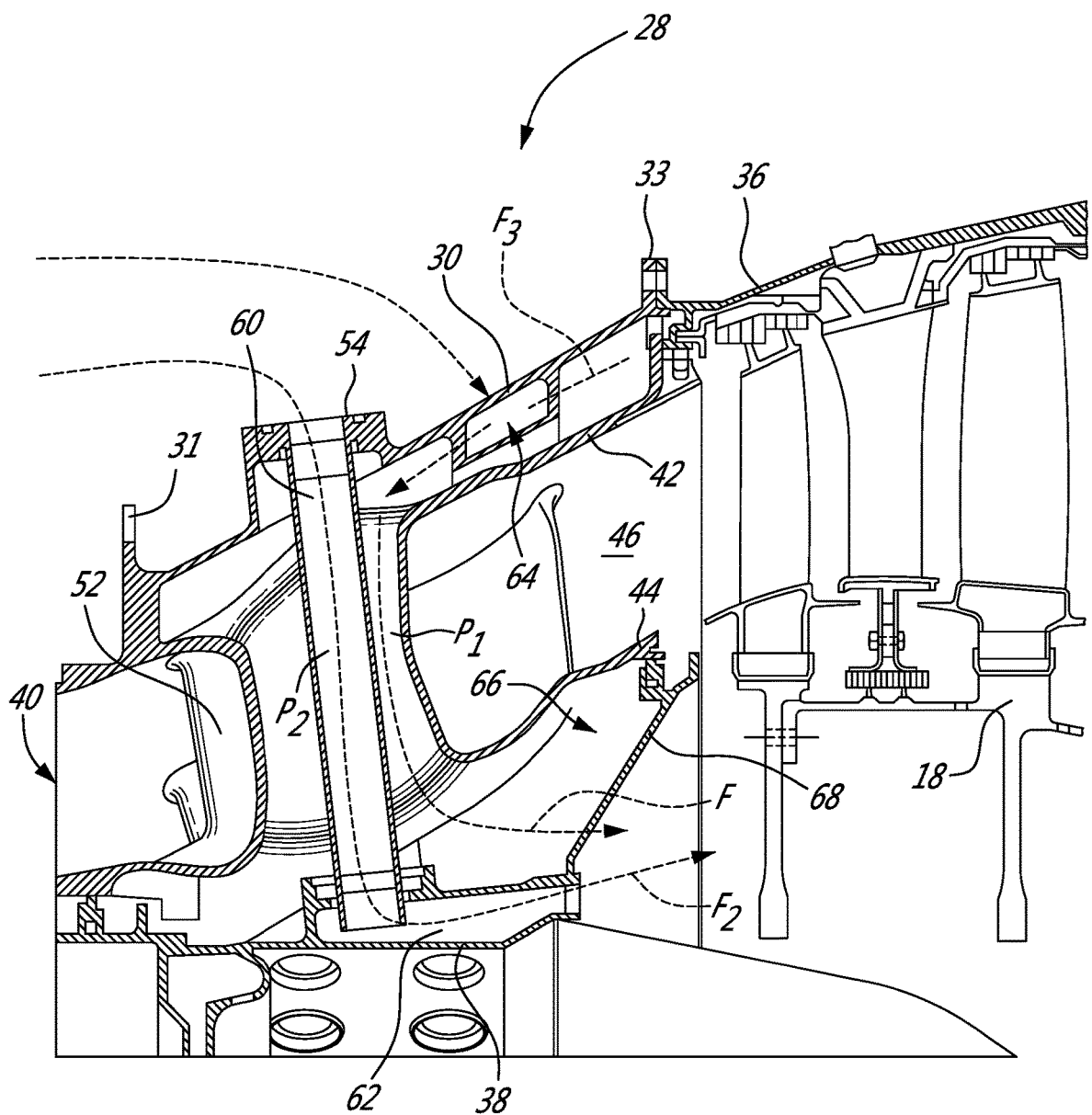
FIG. 3 is a cross-section view of the mid-turbine frame disposed between a HP turbine assembly and a LP turbine assembly of the engine shown in FIG. 1.

As shown in FIG. 3, the MTF 28 may comprise an annular outer case 30 which has forward and aft mounting flanges 31, 33 at both ends with mounting holes therethrough for connection to the HP turbine case (not shown) and the LP turbine case 36. The outer case 30, the HP and the LP turbine cases may form part of the core casing 13 schematically depicted in FIG. 1. The MTF 28 may further comprise an annular inner case 38 concentrically disposed within the outer case 30. A plurality of load transfer spokes (not shown)

may extend radially between the outer case 30 and the inner case 38. The inner case 38 supports the bearing housing 50 (schematically shown in FIG. 1). The bearing housing 50 may be bolted or otherwise suitably mounted to the inner case 38. The loads from the bearings 102 and 104 are transferred to the core casing 13 through the MTF 28.

The MTF 28 may be further provided with an inter-turbine duct (ITD) 40 for directing combustion gases to flow generally axially through the MTF 28. The ITD 40 has an annular outer duct wall 42 and an annular inner duct wall 44. An annular hot gas path 46 is defined between the outer and inner duct walls 42, 44 to direct the combustion gas flow from the HP turbine 24 to the LP turbine 18. The hot gas path forms part of the engine main fluid path. An array of circumferentially spaced-apart hollow airfoils 52 may extend radially through path 46 between the outer and inner duct walls 42 and 44. The load transfer spokes (not shown) may extend through the airfoils 52. The airfoils 52 may be provided in the form of struts having an airfoil profile to act as turbine vanes for properly directing the combustion gases to the LP turbine 18. As shown in FIG. 3 and as discussed herein below, the airfoils 52 may be open-ended to fluidly connect air plenums.

As depicted by the flow arrows F1, F2 in FIG. 3, a coolant supply system, typically an air supply system, may be integrated to the MTF 28 for supplying coolant (e.g. compressor bleed air) to the MTF 28 and the LP turbine 18. As will be seen hereinafter, the air system is configured to minimize heat pick up as the cooling air (or other suitable coolant) travels from the source to its point of application (e.g. a rotor cavity of the LP turbine 18).

According to the illustrated embodiment, the air supply system generally comprises at least one first cooling passage P1 extending through at least a selected one of the hollow airfoils 52 and at least one second cooling passage P2 extending internally through an internal pipe 60 in the at least one selected hollow airfoil 52, the first and second cooling passages P1, P2 having a common output flow to the rotor cavity of the LP turbine 18 where cooling air flows F1, F2 combine according to a predetermined ratio. The first cooling flow F1 flowing between the internal pipe 60 and the airfoil 52 (the annular flow surrounding the internal pipe 60) thermally shields the second cooling flow F2 passing through the internal pipe 60 from the thermally exposed surfaces of the airfoil 52, thereby reducing heat pick up as the second cooling flow F2 travels radially inwardly through the hot gas path 46. In this way cooler air can be provided to the rotor of the LP turbine 18.

According to one embodiment, the air supply system may comprise two internal pipes 60 extending through respective ones of the hollow airfoils 52. However, it is understood that any suitable number of internal pipes may be provided. Each internal pipe 60 is bolted or otherwise suitably connected at a radially outer end thereof to an inlet port 54 provided on the outer case 30. Two of the four external feed pipes 29 (FIG. 2) are operatively connected to respective inlet ports 54 and, thus, the internal pipes 60. The radially inner end of each internal pipe 60 is floatingly engaged with the inner case 38 of the mid-turbine frame 28 for delivering a flow of cooling air in a cavity 62 defined in the inner case 38 of the MTF 28. As illustrated by flow arrows F2, each cavity 62 fluidly links the associated internal pipe 60 to the rotor cavity of the LP turbine 18. According to the illustrated embodiment, the second air passage P2 is, thus, defined by the internal pipes 60, the associated external feed pipes 29 and the cavities 38. However, it is understood that a different combination of components could be used to connect the LP turbine 18 to a source of pressurized cooling air, while minimizing heat pick up as the air travels across the hot gas path 46.

Still according to the illustrated embodiment, the remaining two external feed pipes 29 are operatively connected to an annular inlet plenum 64 defined between the radially outer case 30 of the mid-turbine frame 28 and the outer annular wall 42 of the inter-turbine duct 40. The inlet plenum 64 provides for a uniform distribution of pressurized cooling air all around the inter-turbine duct 40, thereby avoiding local air impingement on the outer duct wall 42, which could potentially lead to hot spots and durability issues. The air directed in plenum 64 ensures proper cooling of the inter-turbine duct 40. As shown by flow arrows F3 in FIG. 3, a first portion of the air received in the plenum 64 flows in a downstream direction through channels defined between the outer case 30 and the LPT case 36 to pressurize and provide cooling to the latter. More particularly, this portion of the cooling air is used to cool and pressurize the outer shroud structure of the LP turbine 18. As depicted by flow arrows F1 in FIG. 3, a major portion of the air directed in the inlet plenum 64 however flows radially inwardly through the hollow airfoils 52 about the internal pipes 60. The air is discharged from the airfoils 52 into an outlet plenum 66 defined between the inner duct wall 44 and the inner case 38 of the MTF 28. The back wall of the plenum 66 may be defined by a baffle 68 extending radially outwardly from the inner case 38. Openings are defined in the baffle 68 to allow air to flow in a generally downstream direction from the outlet plenum 66 to the LPT rotor cavity to pressurize same and provide cooling to LPT rotor drums, as depicted by flow arrow F1 in FIG. 3. According to the illustrated embodiment, the first cooling passage P1 is, thus, formed by inlet plenum 64, the associated external feed pipes 29, the hollow airfoils 52 and the outlet plenum 66. However, it is understood that a different combination of components could be used to thermally shield the second cooling passage P2 while providing secondary air to pressurize and cool the MTF 28 and associated components.

As can be appreciated from FIG. 3, the output flows from the first and second cooling passages P1, P2 mix together upstream from the LP turbine 18 to provide a common cooling flow input to the LP turbine 18. Flow metering devices can be provided to control the flow ratio between the first and second cooling passages. For instance, the flow metering devices could take the form of orifice plates on the feed pipes 29. According to one embodiment, 35% of the total flow to the rotor cavity of the LPT 18 originates from the first cooling passage P1. The remaining 65% is provided via the second cooling passage P2 (i.e. though the internal pipes 60). This provides for a cooler feed of cooling air to the LP turbine rotor. It is understood that the 35%-65% flow split is only particular to a given embodiment. In fact, the flow split can be almost anything as long as the flow distribution is sufficient to pressurize the MTF 28 and ensure proper cooling of the LPT 18. The flow split depends on the source and sink pressure, and the failure modes of the system.

The above description is meant to be exemplary only, and one skilled in the art will recognize that changes may be made to the embodiments described without departing from the scope of the invention disclosed. For example, the MTF and system and the bearing housing may have a different structural configuration that the one described above and shown in the drawings. Also, the air supply system could be used to provide cooling air to a turbine rotor other than a LP turbine rotor. Still other modifications which fall within the scope of the present invention will be apparent to those skilled in the art, in light of a review of this disclosure, and such modifications are intended to fall within the appended claims.

What is claimed is:

1. A gas turbine engine comprising:
   a high pressure turbine (HPT);
   a low pressure turbine (LPT) fluidly connected to the HPT, the LPT including an LPT rotor mounted for rotation about an engine axis, the LPT rotor having a rotor cavity; and
   a mid-turbine frame disposed axially between the HPT and the LPT, the mid-turbine frame comprising an outer case, an inner case structurally connected to the outer case for supporting a bearing housing, an inter-turbine duct disposed radially between the outer case and the inner case, the inter-turbine duct having annular inner and outer walls and an array of circumferentially spaced-apart hollow airfoils extending radially between the annular inner and outer walls, the array of circumferentially spaced-apart hollow airfoils surrounding the bearing housing, the annular inner and outer walls defining a hot gas path therebetween for directing hot gases from the HPT to the LPT, at least one internal pipe extending through at least a first one of the hollow airfoils, a first cooling passage extending between the at least one internal pipe and the at least a first one of the hollow airfoils, the first cooling passage in fluid flow communication with a first air plenum defined between the annular inner wall of the inter-turbine duct and the inner case, the first air plenum in fluid communication with the rotor cavity of the LPT rotor, a second cooling passage extending internally through the at least one internal pipe and having an outlet in fluid communication with a second air plenum defined radially between the inner case and the bearing housing, the second air plenum in fluid flow communication with the rotor cavity of the LPT rotor.

2. The gas turbine engine defined in claim 1, wherein the first plenum has a back wall including a perforated baffle extending from the inner case, the perforated baffle having openings to allow coolant to flow from the first plenum to the rotor cavity.

3. The gas turbine engine defined in claim 1, wherein the first cooling passage has an inlet end in fluid communication with an annular inlet plenum defined radially between the outer case and the annular outer wall of the inter-turbine duct.

4. The gas turbine engine according to claim 3, wherein the annular inlet plenum is fluidly connected to a source of compressor bleed air via a first external pipe.

5. The gas turbine engine according to claim 4, wherein the at least one internal pipe is fluidly connected to the source of compressor bleed air via a second external pipe.

6. The gas turbine engine according to claim 4, wherein orifice plates are provided on the first and the second external pipes for controlling a flow ratio between the first and second cooling passages.

7. The gas turbine engine according to claim 1, wherein a radially inner end of the least one internal pipe is floatingly received within the inner case.

8. The gas turbine engine according to claim 6, wherein, in operation, a majority of a total coolant flow fed into the rotor cavity is delivered via the second cooling passage.

* * * * *